H. WEIDA.
HARD RUBBER BATTERY JAR AND METHOD OF MAKING THE SAME.
APPLICATION FILED OCT. 26, 1916.
1,343,380.
Patented June 15, 1920.
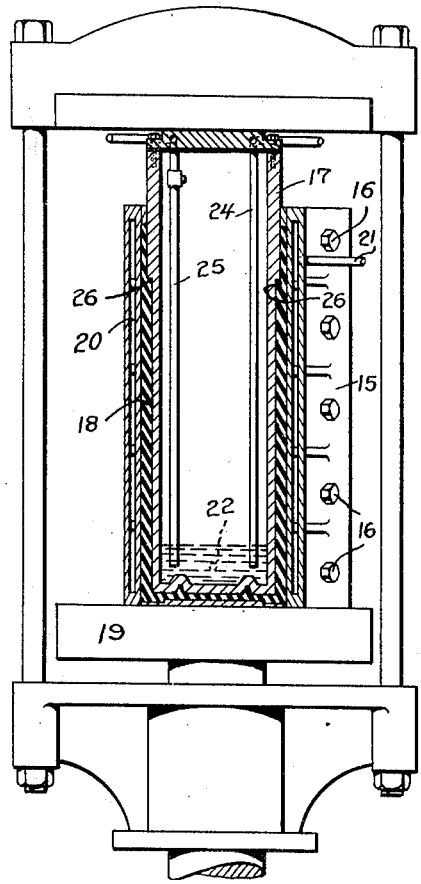
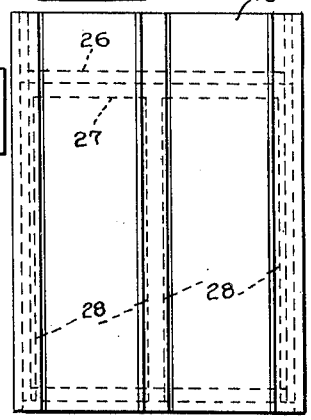
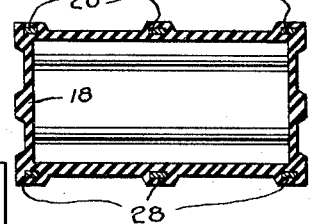
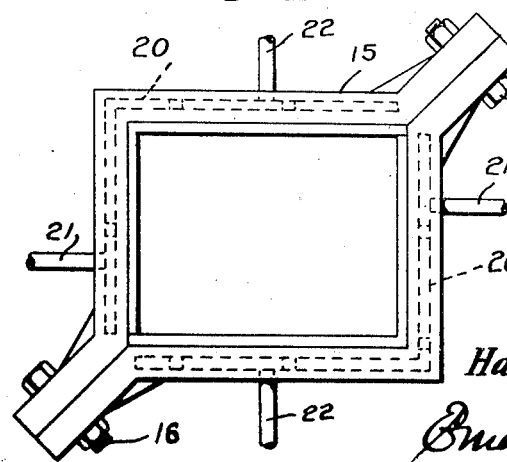
WITNESS:
INVENTOR
Harry Weida,
BY
HIS ATTORNEY

UNITED STATES PATENT OFFICE.

HARRY WEIDA, OF HIGHLAND PARK, NEW JERSEY, ASSIGNOR TO THE INDIA RUBBER COMPANY, A CORPORATION OF NEW JERSEY.

HARD-RUBBER BATTERY-JAR AND METHOD OF MAKING THE SAME.

1,343,380.     Specification of Letters Patent.     Patented June 15, 1920.

Application filed October 26, 1916. Serial No. 127,757.

*To all whom it may concern:*

Be it known that I, HARRY WEIDA, a citizen of the United States, residing at Highland Park, in the county of Middlesex, State of New Jersey, have invented certain new and useful Improvements in Hard-Rubber Battery-Jars and Methods of Making the Same, of which the following is a full, clear, and exact description.

This invention relates to battery jars formed of hard rubber composition, that is, of rubber suitably compounded to partake of a hard consistency during cure. An object is to provide a battery jar devoid of joints, it being well known that defective joints cause the leaks which develop during manufacture and in service and render the jars worthless.

The invention can be readily understood from the following description taken in connection with the accompanying drawing in which:

Figure 1 is a longitudinal sectional view showing apparatus suitable for carrying out the invention, with a battery jar therein.

Fig. 2 is an enlarged plan view of the outer member of the apparatus with the top removed.

Fig. 3 is a side elevation of a reinforced battery jar.

Fig. 4 is a cross-sectional view of the reinforced jar.

In order that the construction of the hard rubber battery jar now in general use may be clearly understood, and the defects thereof appreciated, I will briefly describe the method of manufacture thereof and point out the defects in the product. First, upon the bottom of a core, a sheet of hard rubber composition is placed to form the bottom of the jar. Next a sheet of hard rubber composition is wrapped in a single layer around the sides of the core to form the walls of the jar. The ends of the sheet are then beveled and a butt joint made longitudinally on one wall of the jar. The lower edge portion of the sheet which extends below the bottom, is now bent over upon the bottom and forms a lap joint on the bottom of the jar. The jar thus built, and supported upon the core, is then placed in a vulcanizer and cured in open steam.

Upon inspection after cure, a certain per cent. of the jars manufactured in the above way are found defective on account of leaking joints, and a certain per cent. more develop leaks during service. These defective jars, of course, are worthless and are scrapped. This waste is unavoidable and results from two causes. Hard rubber composition in an unvulcanized state, unlike rubber compounded to be elastic after cure, has a putty like consistency rendering it more or less unadhesive, and this lack of adhesiveness makes it very difficult for the workman to make a tight joint, that is, obtain uninterrupted continuity of inner and outer surface all the way around the edges and corners of the bottom, and on the side wall of the jar. At places spaces exist where the sheets have resisted the efforts of the operator to unite them, and these, harden into circuitous passage ways or leaks during open heat cure, as indicated by the arrow heads. Moreover, dust and small fibers accumulate on the sheets during handling of the same, and prevent their contact at the joints, and consequently additional leaks develop in service due to the acid eating through the foreign substances.

In carrying out the present invention, I form a battery jar by pressing a mass of hard rubber composition between relatively moving confining members so that it flows progressively between said members until it assumes the configuration of the space between said members. By the pressure of the members the walls and bottom of the product are densely compacted and the rubber is squeezed into all corners and edges of the space defined by said members so that there is produced in the product, solid, homogeneous corners and edges having uninterrupted continuity of both the inner surface and the outer surface. Consequently no circuitous passage ways can possibly exist in the jar. Furthermore, the rubber stock is not sheeted, or manipulated by hand, so that no foreign substances can enter, and consequently the development of leaks in service is prevented.

In Figs. 1 and 2 I have shown one type of apparatus suitable for carrying out the invention. In said apparatus I provide an outer member 15, having an interior shape corresponding to the exterior shape of the jar to be produced, the member preferably being formed of metal, and being preferably constructed in two sections bolted together as shown at 16, although this is not essential as I may employ more than two sections, and secure them together otherwise than by bolts. I provide also an inner member 17 having an exterior shape corresponding to the interior shape of the jar to be produced, the member being preferably made of metal, and preferably being formed hollow. Between the confronting surfaces of the inner member and the outer member a space will exist which is of the shape and thickness of the jar 18 to be produced.

In forming the battery jar I insert an unvulcanized mass of hard rubber composition in the outer member, and then place the inner member 17 on top of the mass. I then telescope the members, preferably by means of a hydraulic press designated in general by the numeral 19. As the press closes the mass will be progressively forced between the bottom of the inner member and the bottom of the outer member into and around the edges and corners of said bottoms, and then into the space between the walls of the inner member and outer member, until the entire space between said members is completely filled by a solid, densely compacted homogeneous product which exhibits uninterrupted continuity of both its interior surface and exterior surface throughout its entire area.

To complete the process the jar is cured while confined between and under the high pressure exerted by the members 15—17. For this purpose I preferably provide each section of the outer member 15 with a steam space 20 which is controlled by an inlet pipe 21 and an outlet pipe 22. The hollow interior of the inner member 17 constitutes a steam space which is controlled by an inlet pipe 24 and an outlet pipe 25. However, both the inner and outer member may be heated otherwise than by steam.

Large battery jars of this type are provided internally on two of the opposite walls with shoulders 26 which support the plates of the battery. Since these plates are of considerable weight there is a tendency for the shoulders to crumble. Furthermore in service the weight of these plates tends to bulge the walls of the jar from plumb so that the plates cannot be removed without damage to the jar. To obviate these disadvantages I reinforce the shoulder 26 and the walls of the battery jar preferably with metallic bars 27—28 respectively, these bars being embedded in the walls, as best shown in Fig. 4 and being completely covered by the rubber composition so as not to be exposed upon the interior or exterior of the jar.

Having thus described my invention what I claim and desire to protect by Letters Patent is:

1. A battery jar consisting of integral unitary side and bottom walls of molded hard rubber throughout, said rubber having the characteristics of hard rubber composition vulcanized while being subjected to high pressure from confining members in that it possesses high density throughout.

2. The method of making battery jars comprising the step of inserting an unvulcanized mass of hard rubber composition in a mold, inserting a core within the mold and in contact with the mass, telescoping the core and mold under pressure so that the rubber composition will flow into spaces intermediate the said two members, and vulcanizing the jar thus formed under heat and while it is confined between and under high pressure mechanically exerted by the core and mold.

Signed at New Brunswick, N. J., this 17th day of October, 1916.

HARRY WEIDA.